(12) United States Patent
Crowl et al.

(10) Patent No.: US 11,178,815 B1
(45) Date of Patent: Nov. 23, 2021

(54) STAND-ON MOWER INTERMEDIATE PULLEY SYSTEM

(71) Applicant: Bad Boy, Inc., Batesville, AK (US)

(72) Inventors: Zachary Crowl, Batesville, AK (US); Kenny Cox, Batesville, AK (US)

(73) Assignee: Bad Boy Mowers, LLC, Batesville, AR (US)

(*) Notice: Subject to any disclaimer, the term of this patent is extended or adjusted under 35 U.S.C. 154(b) by 218 days.

(21) Appl. No.: 16/544,368

(22) Filed: Aug. 19, 2019

(51) Int. Cl.
| | | |
|---|---|---|
| *A01D 34/76* | (2006.01) |
| *F16H 55/36* | (2006.01) |
| *F16H 7/02* | (2006.01) |
| *F16H 7/20* | (2006.01) |
| *A01D 69/03* | (2006.01) |
| *A01D 34/81* | (2006.01) |
| *A01D 34/73* | (2006.01) |
| *A01D 34/64* | (2006.01) |
| *A01D 34/82* | (2006.01) |
| *A01D 69/08* | (2006.01) |

(52) U.S. Cl.
CPC .............. *A01D 34/76* (2013.01); *A01D 34/73* (2013.01); *A01D 34/81* (2013.01); *A01D 69/03* (2013.01); *F16H 7/02* (2013.01); *F16H 7/20* (2013.01); *F16H 55/36* (2013.01); *A01D 34/64* (2013.01); *A01D 34/824* (2013.01); *A01D 69/08* (2013.01); *F16H 2055/363* (2013.01)

(58) Field of Classification Search
CPC ........ A01D 34/76; A01D 34/73; A01D 34/81; A01D 69/03; A01D 34/64; A01D 34/824; A01D 69/08; F16H 7/02; F16H 7/20; F16H 55/36; F16H 2055/363

USPC .......................................................... 56/11.6
See application file for complete search history.

(56) References Cited

U.S. PATENT DOCUMENTS

| | | |
|---|---|---|
| 2,442,831 A | 6/1948 | Suttles |
| 2,689,136 A | 9/1954 | Hendrickson |
| 2,915,776 A | 12/1959 | Hanson et al. |
| 3,025,079 A | 3/1962 | Gou |
| 3,669,467 A | 3/1972 | Dunlap et al. |
| 3,737,174 A | 6/1973 | Hickman |
| 4,310,171 A | 1/1982 | Merkle |
| 4,310,717 A | 1/1982 | Eastman et al. |
| 4,485,521 A | 12/1984 | Welsch et al. |
| 4,559,669 A | 12/1985 | Bonzer et al. |
| 4,813,215 A * | 3/1989 | Chase .................... A01D 34/76 56/11.3 |
| 4,903,545 A | 2/1990 | Louis et al. |

(Continued)

OTHER PUBLICATIONS

"Hydro-Gear F7T (ZT-2200) Transmission" available at <https://www.youtube.com/watch?v=sdR7kGvRU10>, Feb. 5, 2013.

(Continued)

*Primary Examiner* — Alicia Torres
*Assistant Examiner* — Matthew Ian Neal
(74) *Attorney, Agent, or Firm* — Bracewell LLP; Christopher L. Drymalla

(57) ABSTRACT

Provided is a mower system that includes an idler pulley, a deck drive pulley coupled to a drive shaft of a mower motor and an intermediate pulley coupled to the mower frame such that a position of the intermediate pulley is fixed relative to a position of the deck drive pulley and the intermediate pulley is positioned to be engaged by a portion of the deck drive belt spanning between the deck drive pulley and the idler pulley.

20 Claims, 8 Drawing Sheets

(56) References Cited

U.S. PATENT DOCUMENTS

| | | | |
|---|---|---|---|
| 5,156,576 A | 10/1992 | Johnson | |
| 5,400,469 A | 3/1995 | Simonsen | |
| 5,542,494 A | 8/1996 | Louis et al. | |
| 5,899,470 A | 5/1999 | Heitzmann | |
| 5,979,920 A | 11/1999 | Krakowiak et al. | |
| 6,026,920 A | 2/2000 | Obeda et al. | |
| 6,170,242 B1 | 1/2001 | Gordon | |
| 6,460,318 B1 | 10/2002 | Ferris et al. | |
| 6,644,425 B1 | 11/2003 | Hauser | |
| 6,732,828 B1 | 5/2004 | Abend et al. | |
| 6,845,837 B2 | 1/2005 | Ohashi et al. | |
| 6,848,937 B1 | 2/2005 | Hsiao | |
| 6,857,254 B2 | 2/2005 | Melone et al. | |
| 6,889,793 B2 * | 5/2005 | Okada | A01D 34/63 180/420 |
| 7,127,889 B1 | 10/2006 | Bennett et al. | |
| 7,363,759 B2 | 4/2008 | Ohashi et al. | |
| 7,364,024 B2 * | 4/2008 | Bartell | A01D 34/6812 192/18 R |
| 7,455,114 B2 | 11/2008 | MacDougall | |
| 7,588,104 B2 | 9/2009 | Ohashi et al. | |
| 7,621,353 B2 | 11/2009 | Ishii et al. | |
| 7,708,292 B2 | 5/2010 | Foster | |
| 8,262,104 B2 | 9/2012 | Kallevig et al. | |
| 8,387,205 B2 | 3/2013 | Weihl et al. | |
| 8,393,236 B1 | 3/2013 | Hauser et al. | |
| 8,470,229 B2 | 6/2013 | Nasviketal | |
| 8,517,159 B1 | 8/2013 | Langenfeld | |
| 8,662,212 B2 | 3/2014 | Lawson, Jr. | |
| 8,733,478 B2 | 5/2014 | Chapman | |
| 9,161,490 B2 | 10/2015 | Melone et al. | |
| 9,723,781 B1 | 8/2017 | Covington | |
| 9,730,386 B1 | 8/2017 | Covington et al. | |
| 9,914,356 B2 | 3/2018 | Simon | |
| D830,419 S | 10/2018 | Covington et al. | |
| D830,420 S | 10/2018 | Covington et al. | |
| 10,188,033 B1 | 1/2019 | Covington et al. | |
| 10,349,577 B1 | 7/2019 | Covington et al. | |
| 10,356,978 B1 | 7/2019 | Covington et al. | |
| 2007/0029118 A1 | 2/2007 | Acharya et al. | |
| 2007/0284839 A1 | 12/2007 | Sasaoka | |
| 2008/0018269 A1 | 1/2008 | Wyatt et al. | |
| 2008/0302075 A1 * | 12/2008 | Eavenson, Sr. | A01D 34/76 56/11.6 |
| 2009/0033054 A1 | 2/2009 | Foster | |
| 2011/0193309 A1 | 8/2011 | Nance | |
| 2011/0197419 A1 | 8/2011 | Melone et al. | |
| 2012/0000173 A1 | 1/2012 | Papke et al. | |
| 2013/0074466 A1 | 3/2013 | Zwieg et al. | |
| 2013/0264788 A1 | 10/2013 | Smyth et al. | |
| 2014/0109538 A1 * | 4/2014 | Sugio | A01D 34/81 56/255 |
| 2016/0152262 A1 | 6/2016 | Laurin et al. | |
| 2017/0181376 A1 * | 6/2017 | Reichard | A01D 34/63 |
| 2018/0084715 A1 * | 3/2018 | Fergus | A01D 69/12 |
| 2018/0125006 A1 * | 5/2018 | Smith | B60N 2/0825 |
| 2018/0229570 A1 | 8/2018 | Fay, II et al. | |
| 2018/0249630 A1 * | 9/2018 | Mullet | A01D 34/66 |
| 2019/0141889 A1 | 5/2019 | Fisher et al. | |

OTHER PUBLICATIONS

"Hydro-Gear ZT-3400 Product Presentation (english)" available at <https://www.youtube.com/watch?v=stZh8uQRh1A>, Feb. 6, 2012.

Bad Boy Mowers "AOS Diesel Model Mower Owner's & Parts Manual" 2010 Edition; pp. 1-40.

Bad Boy Mowers "AOS Model Mower Owner's & Parts Manual" 2010 Edition; pp. 1-40.

Bad Boy Mowers "Bad Boy AOS Part Manual: 35hp Vanguard; 27hp Kawasaki" 2007; pp. 1-31.

Bad Boy Mowers "Bad Boy Diesel Part Manual: 35hp Caterpillar Diesel; 28hp Caterpillar Diesel" 2007; pp. 1-30.

Bad Boy Mowers "Bad Boy Parts Manual for Pup and Lightning Models: 23hp Vanguard; 26hp Kawasaki; 30hp Kohler; 32hp Vanguard" 2007; pp. 1-30.

Bad Boy Mowers "Compact Diesel Model Mower Owner's & Parts Manual" 2010 Edition; pp. 1-36.

Bad Boy Mowers "Diesel AOS & Compact Zero-Turn Mower Owner's, Service & Parts Manual" 2011; pp. 1-56.

Bad Boy Mowers "Diesel Compact Diesel Models Zero-Turn Mower Owner's, Service & Parts Manual" 2012; pp. 1-52; see pp. 33 and 35.

Bad Boy Mowers "Lightning & Pup Zero-Turn Mower Owner's, Service & Parts Manual" 2011; pp. 1-56.

Bad Boy Mowers "Outlaw Stand-On Model Zero-Turn Mower Owner's, Service & Parts Manual"; 2017; pp. 1-58.

Bad Boy Mowers "Outlaw XP Models Zero-Turn Mower Owner's, Service & Parts Manual" 2012; pp. 1-44; see pp. 29-30.

Bad Boy Mowers "Parts Manual for Bad Boy AOS Models: 35hp Vanguard; 27hp Kawasaki" 2008; pp. 1-29.

Bad Boy Mowers "Parts Manual for Bad Boy AOS Models: 35hp Vanguard; 27hp Kawasaki" 2009; pp. 1-28.

Bad Boy Mowers "Parts Manual for Bad Boy Diesel Models: 35hp Caterpillar; 28hp Caterpillar" 2008; pp. 1-28.

Bad Boy Mowers "Parts Manual for Bad Boy Diesel Models: 35hp Caterpillar; 28hp Caterpillar" 2009; pp. 1-27.

Bad Boy Mowers "Parts Manual for Bad Boy Pup and Lightning Models: 23hp Vanguard; 30hp Kohler; 26hp Kawasaki; 32hp Vanguard; 31hp Kawasaki" 2008; pp. 1-36.

Bad Boy Mowers "Parts Manual for Bad Boy Pup and Lightning Models: 23hp Vanguard; 30hp Kohler; 26hp Kawasaki; 32hp Vanguard; 31hp Kawasaki" 2009; pp. 1-33.

Bad Boy Mowers "Pup or Lightning Model Mower Owner's & Parts Manual" 2010 Edition; pp. 1-48.

Bad Boy Mowers "Revolt Stand on Zero-Turn Mower Owner's, Service & Parts Manual"; 2019; pp. 1-52.

Exmark Manufacturing Company, Inc.; "Starts E-Series" brochure; 2019; pp. 1-2.

Exmark Master Parts Viewer; "Model: STE600GKA44300 Year: 2019 Serial Range: 404314159-406294344" available as of Jun. 6, 2019 at: https://lookup3.toro.com/partdex/exmark/index.cfm?xCaller=exmark%26adv=y; p. 1.

Hydro-Gear; "ZT-2800/ZT-3100/ZT-3400 Integrated Zero-Turn Transaxle Service and Repair Manual" BLN-52441, Jan. 2013; pp. 1-52.

Parker; "Integrated Hydrostatic Transmissions HTE, HTJ and HTG Series" Oct. 2015; pp. 1-6.

* cited by examiner

STAND-ON MOWER INTERMEDIATE PULLEY SYSTEM

FIELD

Embodiments relate generally to mowing devices and more particularly to riding mower pulley systems.

BACKGROUND

A lawn mower (or "mower") is often used to cut (or "mow") grassy areas. A mower typically utilizes one or more rotating cutting blades that cut grass as the mower travels across the ground. A mower often takes the form of a walk-behind mower or a riding mower (or "ride-on" mower). A walk-behind mower is typically designed to be operated by an operator that walks behind and guides the mower. Some walk-behind mowers rely on the operator pushing the mower for propulsion (often referred to as "push" mowers). Some walk-behind mowers have a drive system (or "propulsion" system) that assist in propelling the mower (often referred to as "self-propelled" walk-behind mowers). A riding mower is typically designed to be operated by an operator that rides on the mower as it travels across the ground and cuts grass. A riding mower normally includes an operator support, such as a seat or platform, and a drive system that propels the mower.

A zero-turn-radius (ZTR) riding mower is a particular type of riding mower. A ZTR riding mower is often identifiable by right and left control handles (or "control arms") that an operator can push or pull to drive respective right and left drive wheels forward or backward. This enables the mower to make sharp turns with ease, even spinning the entire mower in place—hence the label "zero-turn-radius." A ZTR riding mower is often desirable for its agility, speed, and wide mowing coverage. A ZTR mower typically employs drive units, such as hydrostatic (or "hydraulic") transaxles, that selectively rotate drive wheels forward or backward in response to pushing or pulling of the control handles.

ZTR mowers often take the form of sit-on ZTR mowers or stand-on ZTR mowers. A sit-on ZTR mower typically includes a seat and is designed to be operated with the operator seated in the seat. A stand-on ZTR mower typically includes a platform and is designed to be operated with the operator standing on the platform. An operator may prefer a sit-on ZTR mower over a stand-on ZTR mower, for example, for the comfort provided by mowing in a seated position. An operator may prefer a stand-on ZTR mower over a sit-on ZTR mower, for example, for its compact footprint, easy on-and-off access, and the visual perspective provided in the standing position. A stand-on mower may have a shorter length than a comparably sized sit-on ZTR mower such that it requires less storage space (e.g., less space in a building or on a trailer) and less space for maneuvering during use.

SUMMARY

Although a stand-on zero-turn-radius (ZTR) riding mower can provide advantages over other types of mowers, the compact nature of a stand-on ZTR mower can present significant design challenges. Riding mowers, including ZTR riding mowers, typically employs a deck belt that is circulated to rotate the cutting blades of the mower. The drive belt is usually routed about a drive pulley mounted to a drive shaft of a motor, and is routed about spindle pulleys that are mounted to a mowing deck and have respective cutting blades attached thereto. During operation of the mower, rotation of the drive shaft and the drive pulley drives circulation of the deck belt, and the circulation of the deck belt, in turn, drives rotation of the spindle pulleys and the cutting blades. The drive pulley, the spindle pulleys and other pulleys are typically circular wheels oriented horizontally, such that they rotate about a vertically oriented rotational axis, in a horizontal rotational plane that is oriented transverse to the vertically oriented rotational axis. If two adjacent pulleys are vertically offset from one another, the portion of the deck belt spanning the distance between the two pulleys may be angled relative to the horizontal rotational planes of the pulleys. Thus, the deck belt may exit (or "depart") one pulley at an angle relative to horizontal and enter (or "approach") the next pulley at a similar angle relative to horizontal. In some instances, the horizontal distance between two pulleys is relatively short in comparison to the vertical offset between the pulleys, which can lead to relatively large deck belt exit/entry angles. Unfortunately, relatively large exit/entry angles can cause undesirable deck belt wear or failure. The associated friction (or "rubbing") of the deck belt on the lip of a pulley due to a relatively large exit/entry angle may cause the deck belt to wear prematurely (which can cause the deck belt to slip on the pulley), slip-off of the pulley, or even break. Accordingly, it can be advantageous to reduce exit/entry angles of deck belts.

Unfortunately, misalignment of pulleys is often difficult to avoid, especially in the context of mowers with adjustable cutting heights, such as ZTR mowers. The spindle pulleys, the idler pulley, the stationary pulley and the intermediate pulley (collectively "deck pulleys") of a ZTR mower are often mounted to the mowing deck in vertical alignment with one another. As the mowing deck is moved vertically up and down (e.g., as the mower deck raised or lowered to adjust the cutting height of the blades), the deck pulleys move with the deck, which causes varying levels of vertical offset between the drive pulley and the deck pulleys. As a result, the portions of a deck belt spanning between the drive pulley and an adjacent deck pulley (e.g., the portion of a deck belt between the drive pulley and an idler pulley) may have exit/entry angles that are dependent on the vertical position of the mowing deck. Moreover, due to the relatively short length of stand-on ZTR mowers, the mowing deck is typically located relatively close to the engine and, as a result, the horizontal offset between the drive pulley and an adjacent deck pulley can be relatively small, which can create relatively large deck belt exit/entry angles. Due to the variability of vertical offsets and the short distance between pulleys, stand-on ZTR mowers can be susceptible relatively large exit/entry angles between the drive pulley and adjacent deck pulley pulleys, which can lead to undesirable deck belt wear and failure.

In view of these and other shortcomings of existing systems, provided are embodiments of a mower system having a deck belt system that incorporates a frame-mounted intermediate pulley. In some embodiments, a mower deck belt system includes a drive pulley and an intermediate pulley that is mounted in a fixed position relative to the drive pulley. For example, a mower deck belt system of a stand-on ZTR mower may include a drive pulley mounted to a drive shaft of an engine that is mounted to a frame of the mower and an intermediate pulley that is also mounted to the frame of the mower such that the intermediate pulley does not move vertically or horizontally relative to the drive pulley during operation of the mower. The intermediate pulley may be a pulley located between the drive pulley and a deck pulley that is configured to move vertically relative to the drive pulley during operation of the mower, such as an idler pulley. The intermediate pulley may be positioned between the drive pulley and a deck pulley in that it is engaged by a portion of a deck belt that extends (or "spans") between the drive pulley and the deck pulley. During use, as the drive shaft and the drive pulley is rotated by the engine, the drive pulley may drive circulation of the deck belt from a deck pulley in a path around a portion of the drive pulley engaged by the drive pulley, from the drive pulley in a path around a portion of the intermediate pulley engaged by the deck belt, from the intermediate pulley to the deck pulley, around a portion of the deck pulley engaged by the deck belt, and from the deck pulley to another deck pulley. In the event the deck is raised or lowered, which results in a corresponding vertical movement of the deck pulleys, there may be a corresponding change in the vertical offset between the deck pulley and the intermediate pulley; however, there may not be a change in the vertical offset between the drive pulley and the intermediate pulley. In some embodiments, the span of the deck belt between the deck pulley and the intermediate pulley is longer than the span of the deck belt between the intermediate pulley and the drive pulley. This may help to maintain, for a given amount of vertical movement of the deck relative to the frame, exit/entry angles between the intermediate pulley and the deck pulley that are less than exit/entry angles that would have been seen between the intermediate pulley and the drive pulley had the intermediate pulley been mounted to the deck. Maintaining relatively small exit/entry angles between the drive pulley and the intermediate pulley may help to inhibit deck belt wear and failure.

Provided in some embodiments is stand-on riding mower system that includes the following: a mower frame; a mower motor coupled to the mower frame (the mower motor including a drive shaft adapted to rotate); a mowing deck system coupled to the mower frame and adapted to be raised or lowered relative to the mower frame (the mowing deck system including an idler pulley and a spindle pulley, where the spindle pulley is coupled to a mowing blade and engaged by a deck drive belt, circulation of the deck drive belt is adapted to rotate the spindle pulley and the mowing blade coupled to the spindle pulley, and the idler pulley is biased to push against a deck drive belt to maintain a tension of the deck drive belt); and a deck drive belt system including: the deck drive belt; a deck drive pulley coupled to the drive shaft of the mower motor and engaged by the deck drive belt (where the deck drive pulley is adapted to rotate with the drive shaft and rotation of the deck drive pulley is adapted to cause the circulation of the deck drive belt); and an intermediate pulley coupled to the mower frame such that the intermediate pulley does not move relative to the deck drive pulley (where the intermediate pulley is engaged by a portion of the deck drive belt spanning between the deck drive pulley and the idler pulley).

In some embodiments, the deck drive belt is adapted to circulate from the deck drive pulley to the intermediate pulley, from the intermediate pulley to the idler pulley, and from the idler pulley to the spindle pulley. In some embodiments, a span of the deck drive belt between the idler pulley and the intermediate pulley is longer than a span of the deck drive belt between the intermediate pulley and the deck drive pulley. In some embodiments, centerlines of the intermediate pulley and the deck drive pulley are aligned. In some embodiments, the mowing deck system, the idler pulley and the spindle pulley are adapted to move relative to the intermediate pulley and the deck drive pulley. In some embodiments, the deck drive pulley includes a V-pulley, the spindle pulley includes a V-pulley, the idler pulley includes a flat pulley, and the intermediate pulley includes a flat pulley. In some embodiments, the motor and the intermediate pulley are rigidly coupled to the mower frame. In some embodiments, the mower system includes a zero turn radius (ZTR) riding mower system.

Provided in some embodiments is a mower system that includes the following: a mower frame; a mower motor coupled to the mower frame (the mower motor including a drive shaft adapted to rotate); a mowing deck system coupled to the mower frame and adapted to be raised or lowered relative to the mower frame (the mowing deck system including an idler pulley biased into engagement with a deck drive belt to maintain a tension of the deck drive belt, where circulation of the deck drive belt is adapted to rotate a spindle pulley and a mowing blade coupled to the spindle pulley); and a deck drive belt system including: the deck drive belt; a deck drive pulley adapted to couple to the drive shaft of the mower motor and be engaged by the deck drive belt (where the deck drive pulley is adapted to rotate with the drive shaft and rotation of the deck drive pulley is adapted to cause the circulation of the deck drive belt); and an intermediate pulley coupled to the mower frame such that the intermediate pulley does not move relative to the deck drive pulley (where the intermediate pulley is adapted to be engaged by a portion of the deck drive belt spanning between the deck drive pulley and the idler pulley).

In some embodiments, the deck drive belt is adapted to circulate from the deck drive pulley to the intermediate pulley, from the intermediate pulley to the idler pulley, and from the idler pulley to the spindle pulley. In some embodiments, a span of the deck drive belt between the idler pulley and the intermediate pulley is longer than a span of the deck drive belt between the intermediate pulley and the deck drive pulley. In some embodiments, centerlines of the intermediate pulley and the deck drive pulley are aligned. In some embodiments, the mowing deck system and the idler pulley are adapted to move relative to the intermediate pulley and the deck drive pulley. In some embodiments, the deck drive pulley includes a V-pulley, the idler pulley includes a flat pulley, and the intermediate pulley includes a flat pulley. In some embodiments, the motor and the intermediate pulley are rigidly coupled to the mower frame. In some embodiments, the mower system includes a stand-on riding mower system. In some embodiments, the mower system includes a zero turn radius (ZTR) riding mower system.

Provided in some embodiments is a mower system that includes the following: an idler pulley biased into engagement with a deck drive belt to maintain a tension of the deck drive belt (where circulation of the deck drive belt is adapted to rotate a spindle pulley and a mowing blade coupled to the spindle pulley); a deck drive pulley coupled to a drive shaft of a mower motor coupled to a mower frame of the mower system (the deck drive pulley adapted to be engaged by the deck drive belt, where the deck drive pulley is adapted to be rotated by the drive shaft and rotation of the deck drive pulley is adapted to cause the circulation of the deck drive belt); and an intermediate pulley coupled to the mower frame such that a position of the intermediate pulley is fixed relative to a position of the deck drive pulley (where the intermediate pulley is adapted to be engaged by a portion of the deck drive belt spanning between the deck drive pulley and the idler pulley).

In some embodiments, the idler pulley is adapted to move relative to the deck drive pulley and the intermediate pulley.

In some embodiments, the deck drive belt is adapted to circulate from the deck drive pulley to the intermediate pulley, and from the intermediate pulley to the idler pulley.

Figure 1:
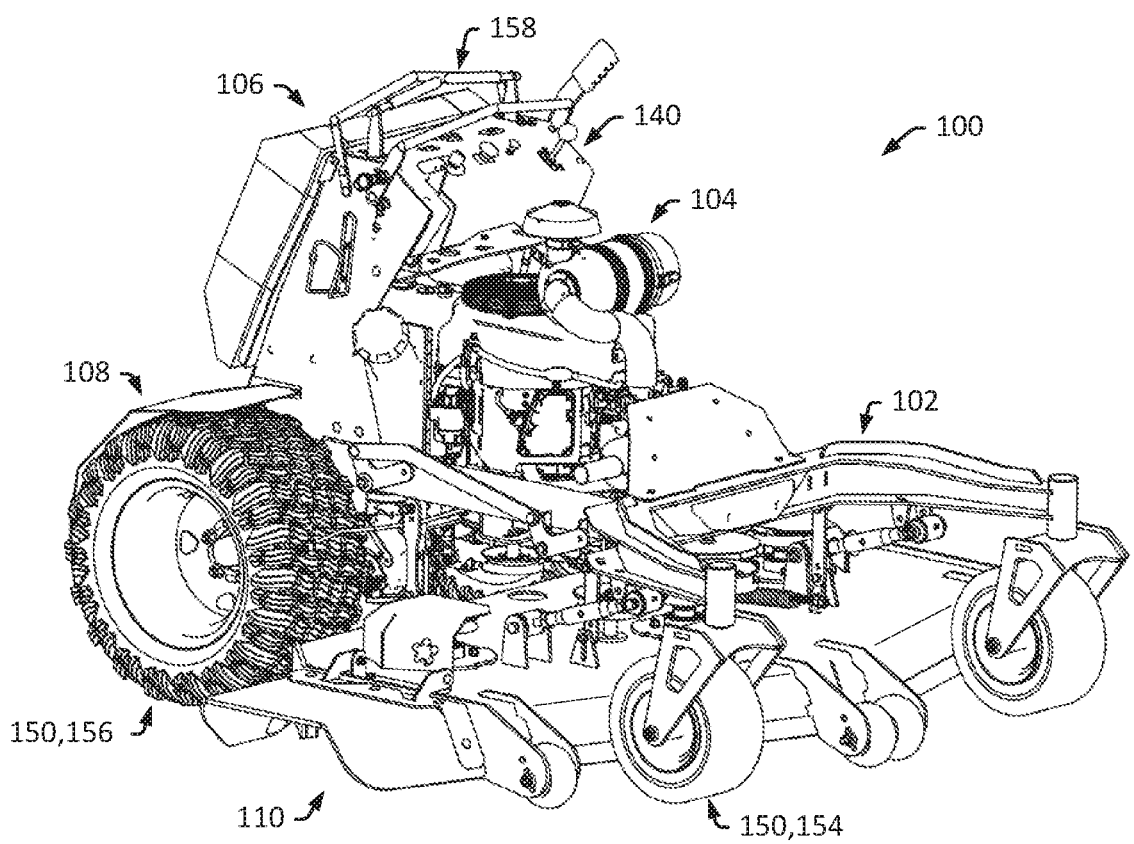
FIG. 1 is a diagram that illustrates a mower system in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of a mower system having a deck belt system that incorporates a frame-mounted intermediate pulley. In some embodiments, a mower deck belt system includes a drive pulley and an intermediate pulley that is mounted in a fixed position relative to the drive pulley. For example, a mower deck belt system of a stand-on ZTR mower may include a drive pulley mounted to a drive shaft of an engine mounted to a frame of the mower and an intermediate pulley that is also mounted to the frame of the mower such that the intermediate pulley does not move vertically or horizontally relative to the drive pulley during operation of the mower. The intermediate pulley may be a pulley located between the drive pulley and a deck pulley that is configured to move vertically relative to the drive pulley during operation of the mower, such as an idler pulley. The intermediate pulley may be positioned between the drive pulley and a deck pulley in that it is engaged by a portion of a deck belt that extends (or "spans") between the drive pulley and the deck pulley. During use, as the drive shaft and the drive pulley is rotated by the engine, the drive pulley may drive circulation of the deck belt from a deck pulley in a path around a portion of the drive pulley engaged by the drive pulley, from the drive pulley in a path around a portion of the intermediate pulley engaged by the deck belt, from the intermediate pulley to the deck pulley, around a portion of the deck pulley engaged by the deck belt, and from the deck pulley to another deck pulley. In the event the deck is raised or lowered, which results in a corresponding vertical movement of the deck pulleys, there may be a corresponding change in the vertical offset between the deck pulley and the intermediate pulley; however, there may not be a change in the vertical offset between the drive pulley and the intermediate pulley. In some embodiments, the span of the deck belt between the deck pulley and the intermediate pulley is longer than the span of the deck belt between the intermediate pulley and the drive pulley. This may help to maintain, for a given amount of vertical movement of the deck relative to the frame, exit/entry angles between the intermediate pulley and the deck pulley that are less than exit/entry angles that would have been seen between the intermediate pulley and the drive pulley had the intermediate pulley been mounted to the deck. Maintaining relatively small exit/entry angles between the drive pulley and the intermediate pulley may help to inhibit deck belt wear and failure.

FIG. 1 is a diagram that illustrates a mower system (or "mower") 100 in accordance with one or more embodiments. In some embodiments, the mower 100 is a stand-on zero-turn-radius (ZTR) riding mower that includes, a frame system 102, a power system 104, a control system 106, a drive system 108, and a cutting system 110.

In some embodiments, the frame system 102 is a rigid structure that supports components of the mower 100. For example, the frame system (or "frame") 102 may include members that are rigidly fastened to one another such that they do not move relative to one another. In some embodiments, the frame 102 includes a frame weldment 112. The frame weldment 112 may include a rigid metal structure formed of multiple metal members that are welded, or similarly fastened, together. Other components of the mower 100 may be coupled to the frame 102 to position them relative to the frame 102 and to one another.

Figure 2:
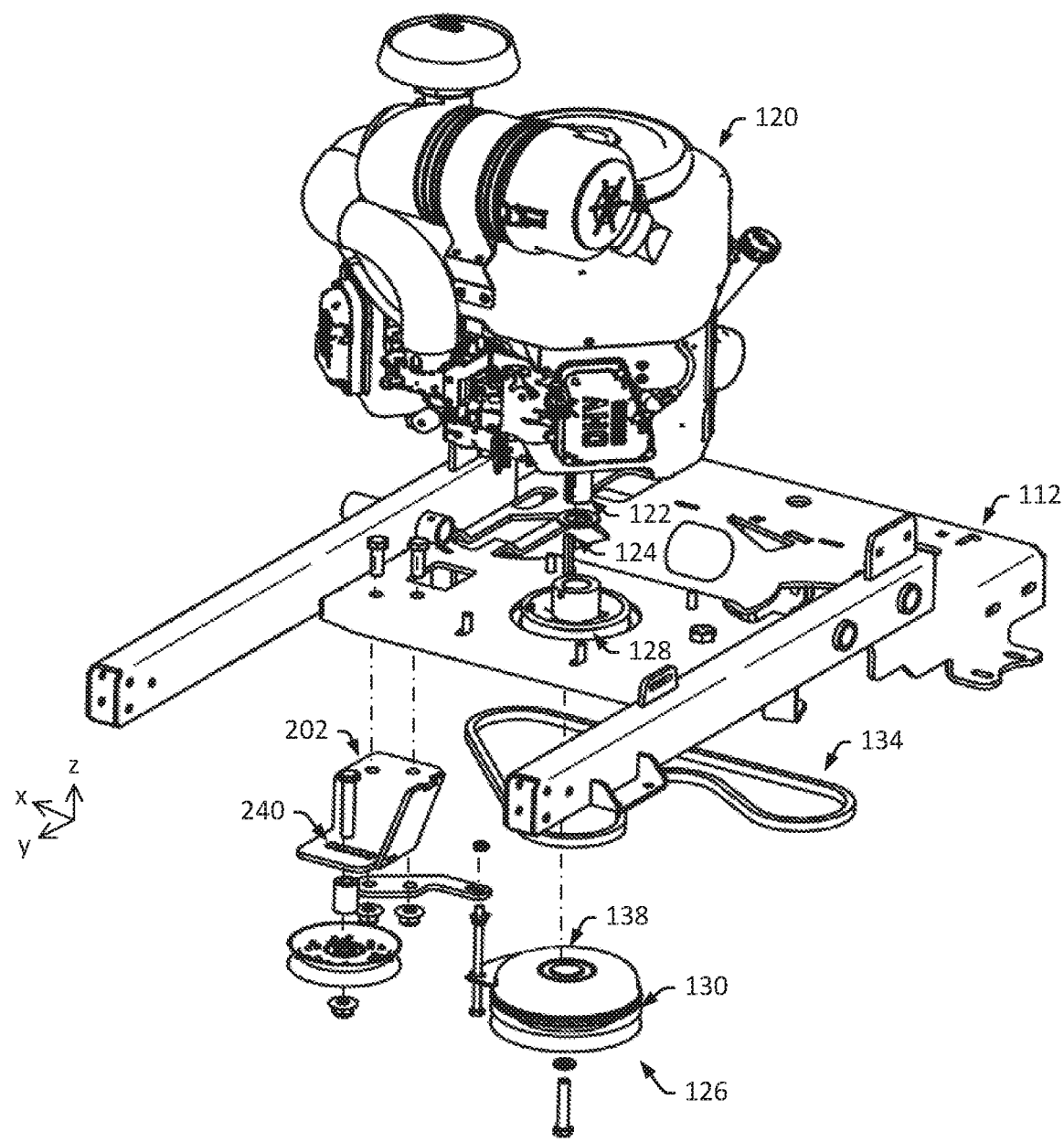
FIG. 2 is a diagram that illustrates a motor in accordance with one or more embodiments.

In some embodiments, the power system 104 includes a motor 120 (see, e.g., FIG. 2). The motor 120 may supply motive power used to operate the mower 100. In some embodiments, the motor 120 includes an engine, such as an internal combustion engine (e.g., a gas-fueled engine, a diesel-fueled engine, or a natural gas-fueled engine) or an electric motor. In some embodiments, the motor 120 is coupled to the frame 102. For example, the motor 120 may be bolted, or similarly fastened, to the frame weldment 112. In such an embodiment, the motor 120 may be rigidly secured to the frame weldment 112 such that the motor 120 does not move relative to the frame weldment 112 during operation of the mower 100.

In some embodiments, the motor 120 includes a drive shaft 122 (see, e.g., FIG. 2). For example, the drive shaft 122 may be an elongated cylindrical member that extends downward from an underside of the motor 120. In some embodiments, the power generated by the motor 120 rotates (or "drives") the drive shaft 122 which can be used as motive power for other components of the mower 100. For example, the power generated by the motor 120 may drive rotation of the drive shaft 122 about its longitudinal axis ("drive shaft axis") 124, which drives circulation of drive belts 132 (see, e.g., FIGS. 4B and 4C) that transmit motive power from the drive shaft 122 to the drive system 108 and the cutting system 110.

In some embodiments, one or more drive pulleys 126 are coupled to the drive shaft 122 (see, e.g., FIG. 2). The drive pulleys 126 may include, for example, a pump drive pulley 128 and a deck drive pulley 130 coupled to the drive shaft 122 of the motor 120. In some embodiments, the drive pulleys 126 engage with respective drive belts 132 that are employed to transmit motive power to other components of the mower 100. For example, the pump drive pulley 128 may engage with a pump drive belt 134 (see, e.g., FIGS. 2 and 4A-4C) that is circulated to transmit motive power to the drive system 108. The deck drive pulley 130 may engage with a deck drive belt (or "deck belt") 136 (see, e.g., FIGS. 3, 4A-4C, 5 and 7A-7C) that is circulated to transmit motive power to the cutting system 110. During operation of the mower 100, the motor 120 may be operated to rotate the drive shaft 122, the pump drive pulley 128 and the deck drive pulley 130, which, in turn, drives circulation of the pump drive belt 134 and circulation of the deck drive belt 136. In some embodiments, the rotational axes of the drive shaft 122, the pump drive pulley 128 and the deck drive pulley 130 are coaxial.

In some embodiments, the drive belts 132 are V-belts and the drive pulleys 126 are V-drive pulleys. A V-belt may include a flexible belt (e.g., a rubber belt) having a generally trapezoidal shape. A first side ("front," "inside" or "V") of the drive belt may have a V-shaped profile for engaging with a complementary V-shaped circumferential groove of a V-pulley. A second side ("back," "outside" or "flat" side) of the V-belt (which is opposite the first side) may have a flat shaped profile for engaging with a commentary flat-shaped circumferential face of a flat-pulley.

A V-belt pulley may have a V-shaped circumferential grove that is shaped to engage a complementary V side of a V-belt. A flat-belt pulley may have a flat-shaped circumferential groove (or "face") that is shaped to engage a complementary flat side of a belt, such as a flat side of a V-belt or a side of a flat-belt. For example, the pump drive pulley 128 may have a V-shaped circumferential groove that engages with a V-side of the pump drive belt 134, and the deck drive pulley 130 may have a V-shaped circumferential groove that engages with a V-side of the deck drive belt 136.

In some embodiments, the deck drive pulley 130 is part of a clutched pulley system (or "clutched pulley"). A clutched pulley may include a pulley and a pulley clutch mechanism (or "pulley clutch") that can be engaged or disengaged to regulate the transfer of torque to the pulley. This may provide for selective engagement and disengagement of the pulley, as well as belts and systems driven by the pulley. For example, a pulley clutch 138 may be provided between the drive shaft 122 and the deck drive pulley 130, which can be engaged or disengaged to facilitate or inhibit, respectively, the transfer the rotational torque of the drive shaft 122 to the deck drive pulley 130 and the deck drive belt 136. This may provide for selective engagement and disengagement of the deck drive belt 136 and the cutting system 110.

In some embodiments, the control system 106 includes controls 140 (see, e.g., FIG. 1) for regulating operation of the mower 100. For example, the control system 106 may include an ignition switch (e.g., a switch operable to start or stop operation of the motor 120), a throttle control (e.g., a knob operable to regulate the operational speed of the motor 120), a blade control (e.g., a knob operable to engage or disengage the cutting system 110), a wheel brake control (e.g., a lever operable to engage or disengage a wheel brake), a deck height control (e.g., a lever to adjust a height of a cutting deck), or a user interface (e.g., a display of status information for the mower 100, such as hours and oil level). An operator may interact with the control system 106 to operate the mower 100 or to monitor various aspects of the operation of the mower 100.

In some embodiments, the drive system (or "propulsion system") 108 includes components for propelling (or "driving") the mower 100 across the ground. In some embodiments, the drive system 108 includes wheels 150 (see, e.g., FIGS. 1 and 4A-4C) and one or more drive units 152 (see, e.g., FIGS. 4A-4C) that supply motive power to the wheels 150. For example, the drive system 108 may include right and left forward wheels ("front wheels") 154 and right and left rear wheels ("back wheels") 156, and right and left drive units 152 operable to drive rotation of the right and left rear wheels 156, respectively.

For reference, the right and left sides of the mower 100 may be defined relative to the position of an operator facing forward (the direction in which an operator is expected to be primarily facing) while operating the mower 100. Accordingly, "forward" or "front" may refer to the direction that an operator is expected to be primarily facing while operating the mower 100. In accordance with the coordinate system axes provided in the figures, "right" may refer to the positive "x" direction, "left" may refer to the negative "x" direction, "front" or "forward" may refer to the positive "y" direction, and "back" or "backward" may refer to the negative "y" direction. A longitudinal axis 157 of the mower 100 may be oriented in the "y" direction, at or near a midpoint between the rear wheels 156 of the mower 100.

The front wheels 154 may be positioned at or near a front end of the frame system 102 to support a front portion of the mower 100. In some embodiments, the front wheels 154 are caster wheels that swivel about a vertically oriented rotational axis (e.g., a rotational axis oriented in the y-direction) in response to corresponding movements of the mower 100. The front wheels 154 may be referred to as "non-driven" wheels in that they do not receive motive power intended to propel the mower 100. The rear wheels 156 may be positioned at or near a rear end of the frame system 102 to support a rear portion of the mower 100. In some embodiments, the drive units 152 drive rotation of the rear wheels 156 to propel the mower 100. For example, each of the right and left rear wheels 156 may be coupled to a drive axle of the right and left drive units 152, respectively, and each of the drive units 152 may be selectively operable to rotate its drive axle and the attached wheel forward or backward (e.g., about a rotational axis oriented in the x-direction). The rear wheels 156 may be referred to as "driven" or "drive" wheels in that they receive (and are driven into rotation by) motive power intended to propel the mower 100.

In some embodiments, each of the drive units 152 is a hydraulic drive unit. For example, each of the drive units 152 may be an integrated hydrostatic (or "hydraulic") transaxle (also referred to as an "integrated transaxle" or "transaxle"). A transaxle may include a hydraulic pump, a hydraulic motor, and a drive axle integrated together in a single unit. In some embodiments, the drive units 152 transmit motive power to rotate an attached wheel in response to selective operation of associated control handles (or "levers") 158 (see, e.g., FIG. 1). For example, when a control handle 158 of a drive unit 152 is pushed forward or backward the drive axle of the drive unit 152 and the attached rear wheel 156 may be rotated forward or backward, respectively. An operator of the mower 100 may simultaneously push both of the right and left control handles 158 about the same distance forward to drive the mower 100 forward or may vary the distance of the control handles 158 to turn the mower 100.

Figure 4A:
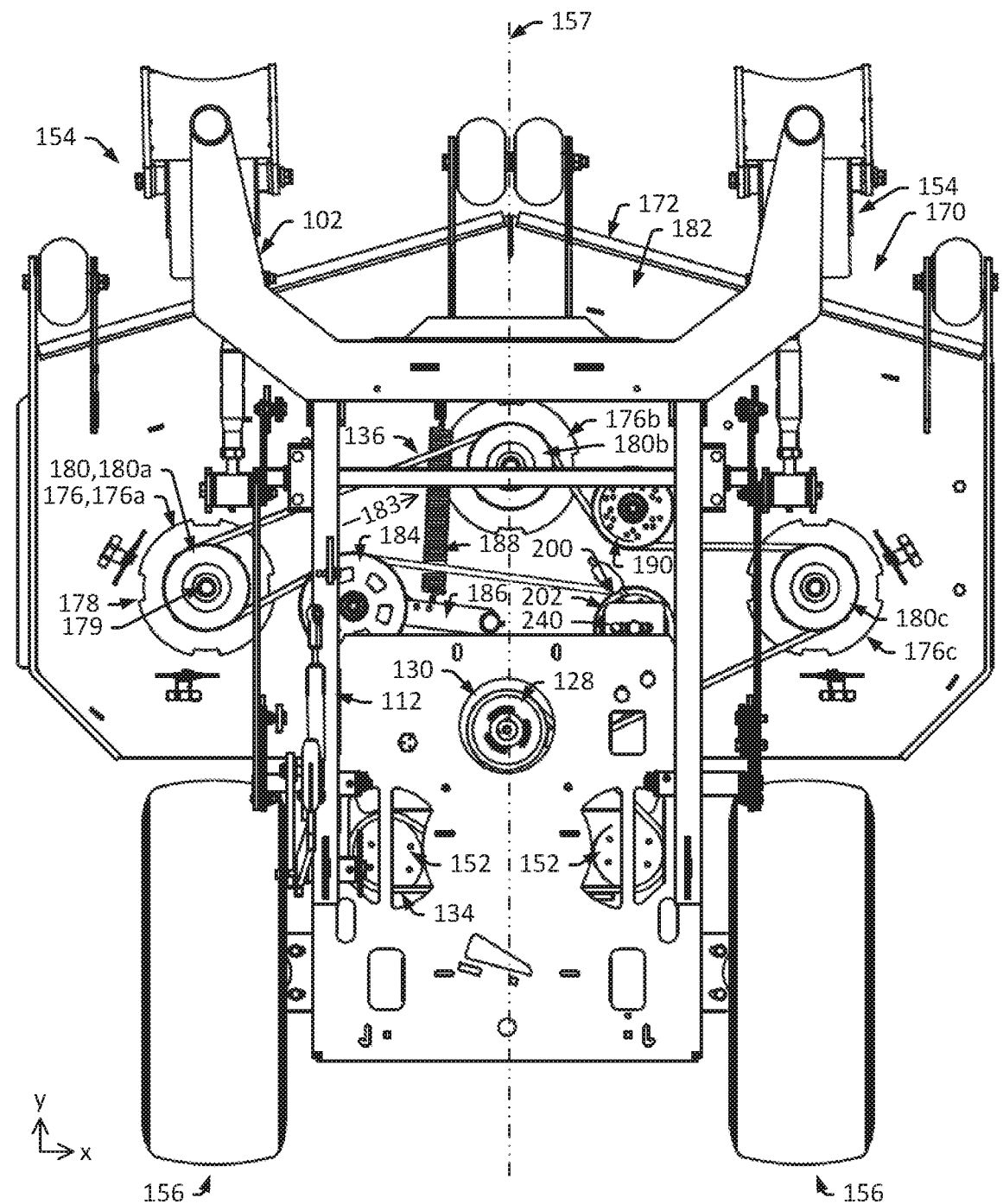
FIGS. 4A-4C are diagrams that illustrate top views of a deck drive belt system in accordance with one or more embodiments.
Figure 4B:
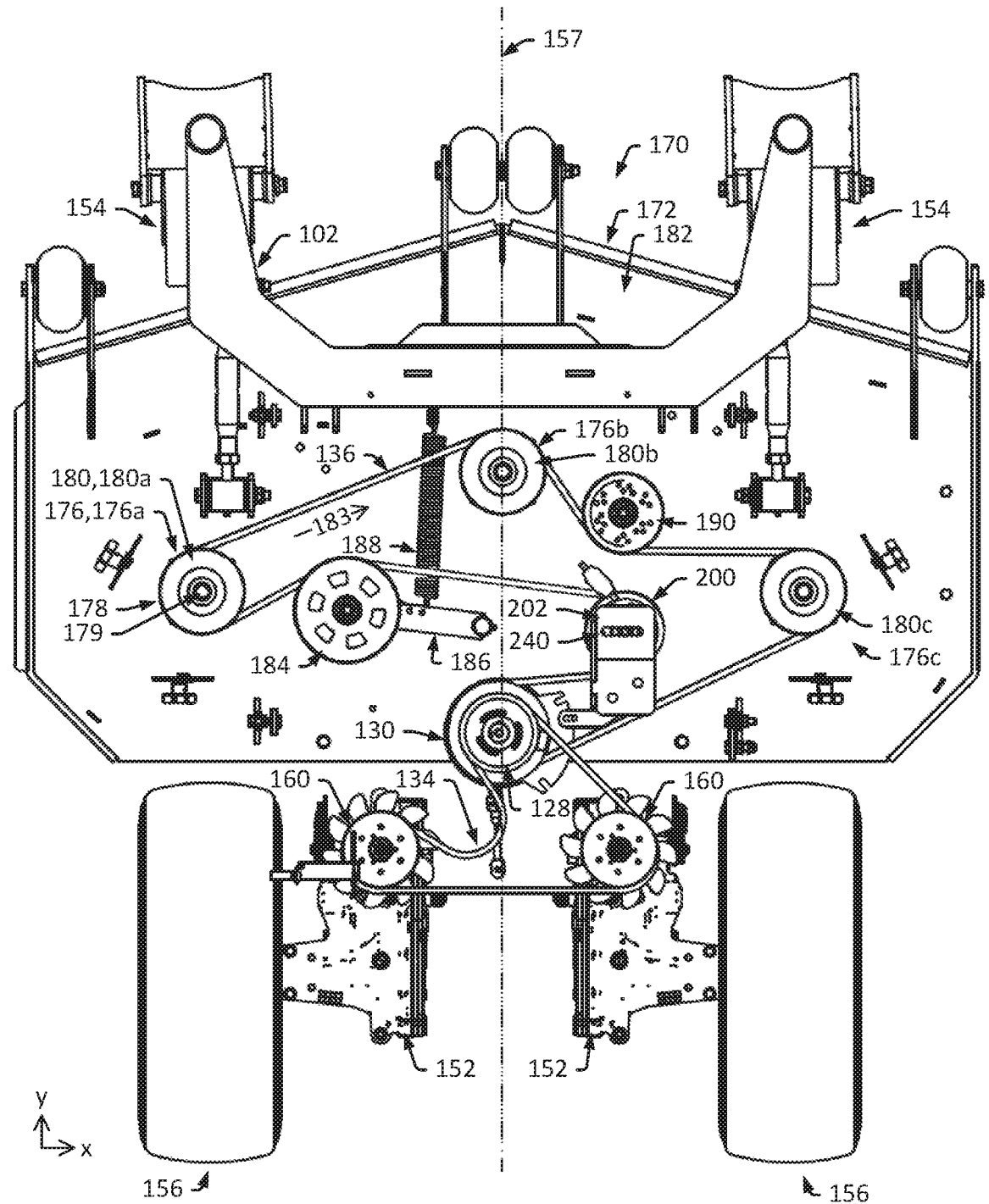
Figure 4C:
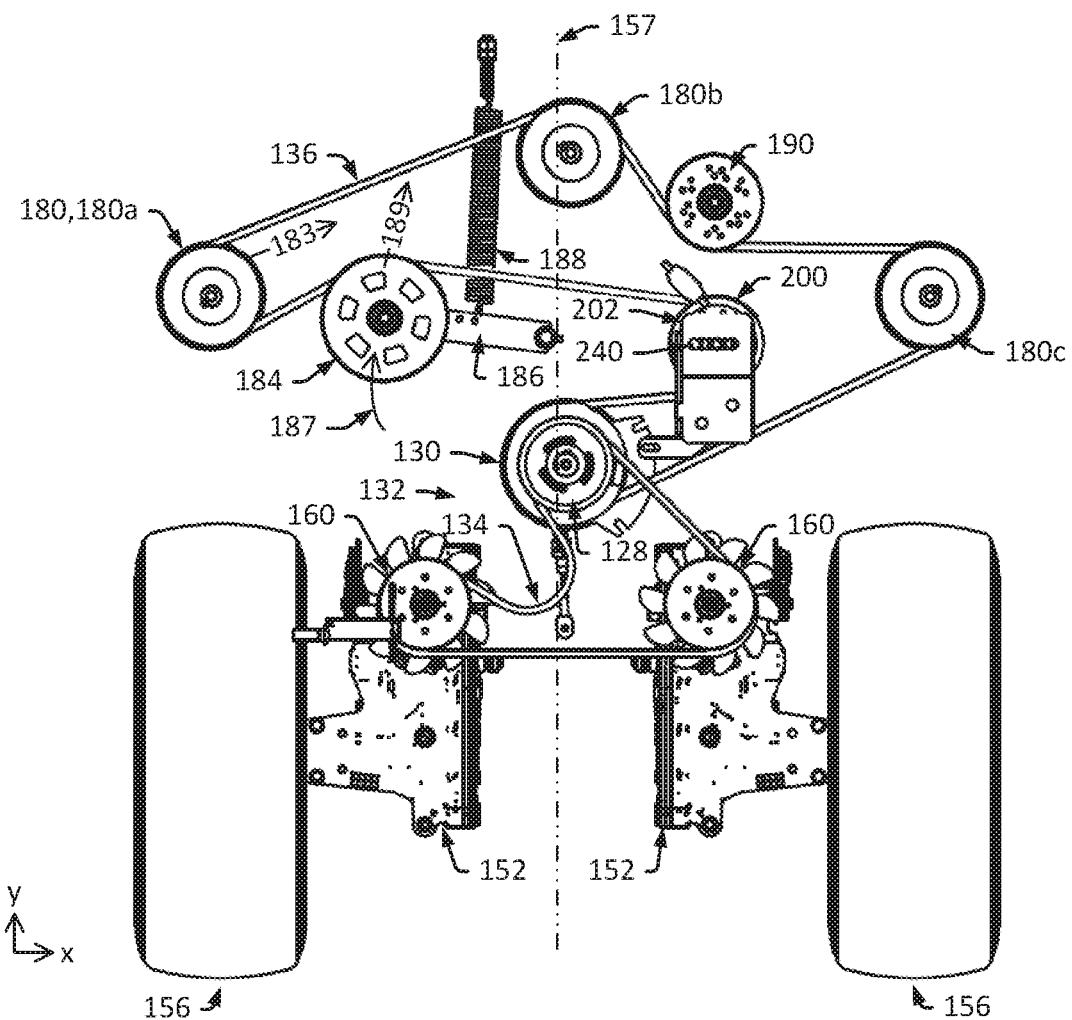
Figure 5:
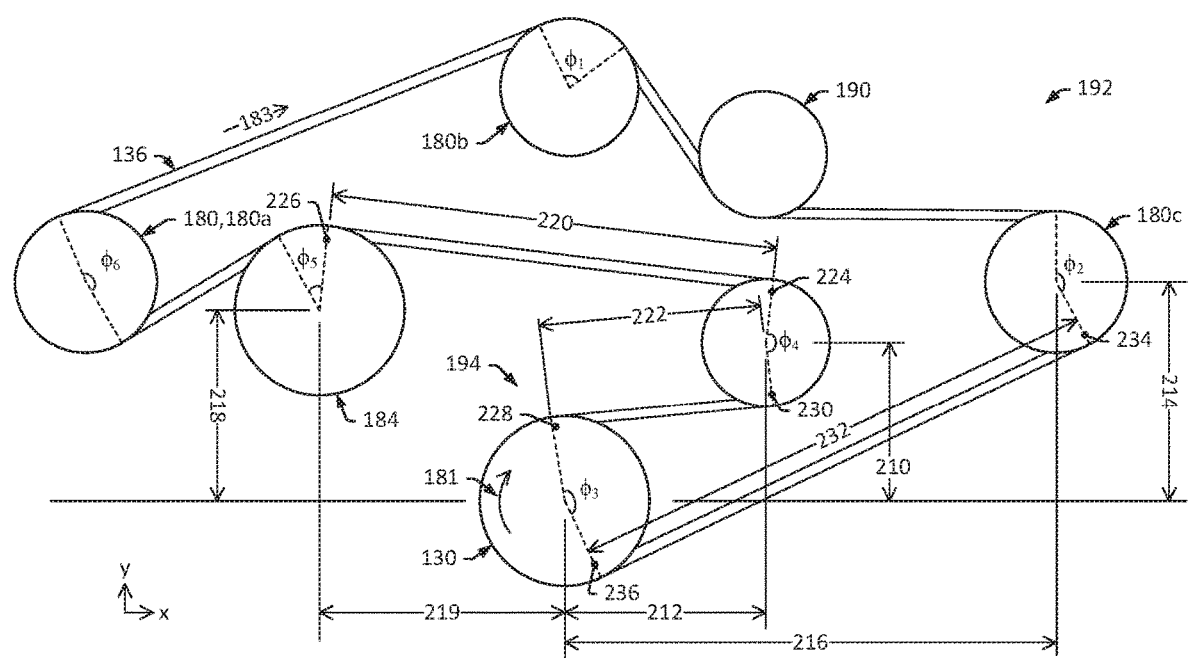
FIG. 5 is a diagram that illustrates a top view of pulleys and a deck drive belt in accordance with one or more embodiments.

In some embodiments, each of the drive units 152 includes a drive unit input pulley 160 (see, e.g., FIGS. 4A-4C). During operation of the mower 100, the pump drive belt 134 may engage the drive unit input pulleys 160 of the drive units 152, and circulation of the pump drive belt 134 may rotate the drive unit input pulleys 160. Rotation of the drive unit input pulley 160 of each of the drive units 152 may provide motive power that drives a pump of the drive unit 160, which drives a hydraulic motor of the drive unit 152, which drives rotation of the drive axle of the drive unit 152.

In some embodiments, the cutting system 110 includes components that provide for cutting (or "mowing") of grass. In some embodiments, the cutting system 110 includes a mowing deck system (or "deck system") 170 (see, e.g., FIGS. 3 and 4A-4B). The mowing deck system 170 may include a mowing deck (or "deck") 172 that houses one or more cutting blades (or "blades") 174. During operation of the mower 100, the blades 174 may be rotated to cut (or "mow") grass under the deck 172 as the mower 100 traverses the ground. The deck 172 may be a metal housing that shields the operator and components of the mower 100 from debris, such as flying grass, dust or rocks that is generated by the rotating blades 174.

In some embodiments, the mowing blades 174 are coupled to respective spindle assemblies (or "spindles") 176 which are coupled to the deck 172. Each of the spindles 176 may include a spindle housing 178, a spindle shaft 179 and a spindle pulley 180. The spindle housing 178 may include a flange that is coupled (e.g., bolted or similarly fastened) to a top plate 182 of the deck 172. The top plate 182 of the deck 172 may include, for example, a horizontally oriented steel plate. The spindle shaft 179 may include a cylindrical shaft that extends through the spindle housing 178 and above and below the top plate 182 of the deck 172. A blade 174 may be coupled (e.g., bolted or similarly fastened) to a lower end of the spindle shaft 179 that terminates under the deck 172 such that the blade 174 is suspended under the deck 172. The spindle pulley 180 may be coupled to an upper end of the spindle shaft 179 that terminates above the deck 172 such that the spindle pulley 180 is located above (or "on top of") the top plate 182 of the deck 172. Rotation of the spindle pulley 180 may cause a corresponding rotation of the spindle shaft 179 and the blade 174. The spindle pulley 180 may be rotated, for example, by circulation of the deck drive belt 136. In some embodiments, each of the spindle pulleys 180 is a V-drive pulley that is engaged by a V-side of the deck drive belt 136. In some embodiments, the rotational axes of the spindle shaft 179 and the spindle pulley 180 of a spindle 176 and a blade 174 coupled to the spindle 176 are coaxial.

Figure 3:
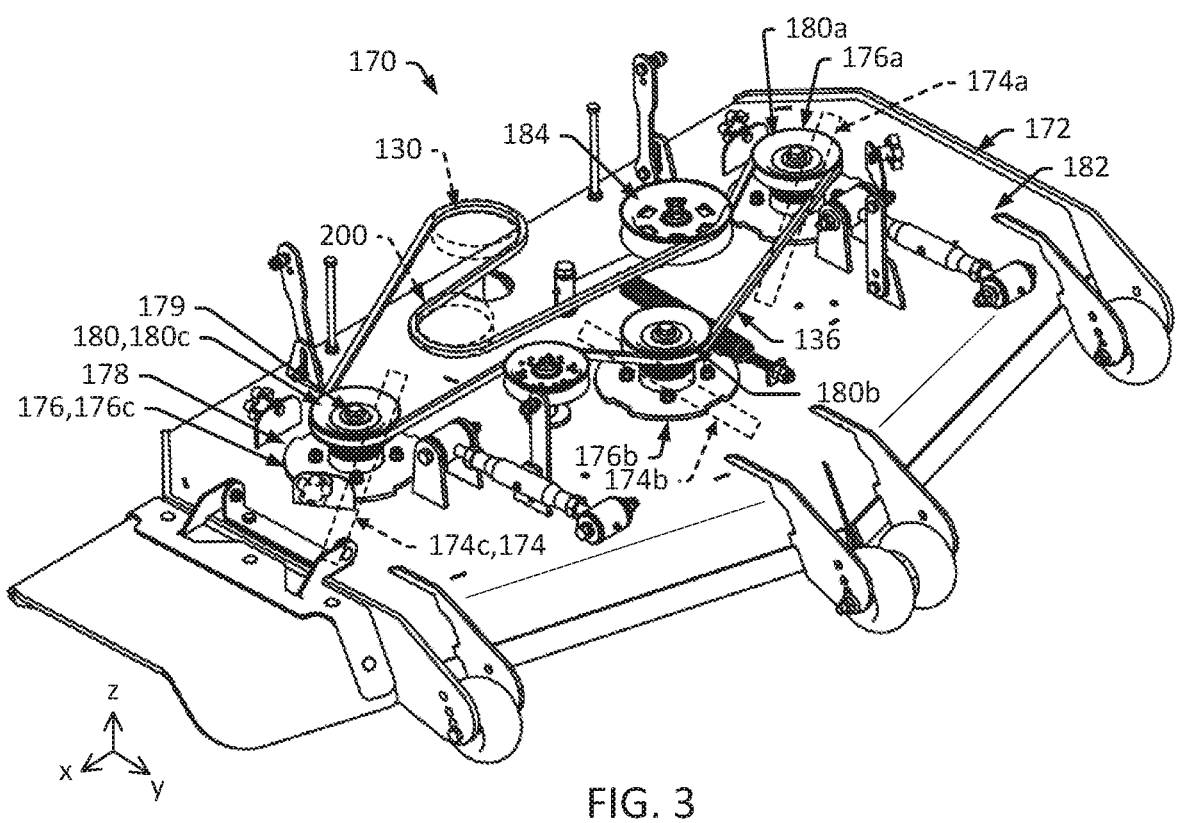
FIG. 3 is a diagram that illustrates a deck system in accordance with one or more embodiments.

In some embodiments, the cutting system 110 includes multiple blades 174 and associated spindles 176 (see, e.g., FIGS. 3 and 4A-4B). For example, the deck system 170 may include a first (left) blade 174a coupled to a first (left) spindle 176a, a second (center) blade 174b coupled to a second (center) spindle 176b, and a third (right) blade 174c coupled to a second (center) spindle 176c. Each of the spindles 176a, 176b and 176c may be coupled (e.g., bolted or fastened in a similar manner) to the top plate 182 of the deck 172 such that the spindle pulleys 180a, 180b and 180c do not move in a vertical or horizontal direction relative to the top plate 182 of the deck 172 during operation of the mower 100. During operation of the mower 100, the deck drive pulley 130 may be rotated clockwise (e.g., in a clockwise direction as indicated by arrow 181) and corresponding circulation of the deck drive belt 136 (e.g., in a clockwise direction as indicated by arrow 183) may drive rotation of the spindle pulleys 180a, 180b and 180c and the blades 174a, 174b and 174c. The spindle pulleys 180a, 180b and 180c may be referred to as "driven" pulleys in that they are driven into rotation to transfer torque to (or to "drive") another component of the mower 100, specifically to drive the respective blades 174a, 174b and 174c attached thereto. The stationary pulley 190, the intermediate pulley 200 and the idler pulley 184 may be referred to as "guide" pulleys in that they provide for defining a routing of the deck drive belt 136, but are not intended to transfer torque to another component of the mower 100.

In some embodiments, the deck system 170 includes an idler pulley 184 (see, e.g., FIGS. 3, 4A-4C and 5). The idler pulley 184 may include a pulley that engages and pushes against a "slack" portion of the deck drive belt 136. This may reduce slack in the deck drive belt 136 and maintain a tension of the deck drive belt 136. For example, the idler pulley 184 may be a flat pulley that is engaged by a flat side of a portion of the deck drive belt spanning between the deck drive pulley 130 and the first (left) spindle pulley 180a of the first (left) spindle 176a. The idler pulley 184 may be rotatably coupled to the top plate 182 of the deck 172 by way of an idler arm 186 coupled to the deck 172. The idler pulley 184 may be biased into engagement with the deck drive belt 136 by way of an idler arm spring 188 that exerts a corresponding biasing force on the idler arm 186 and idler pulley 184. During operation, the biasing force of the idler arm spring 188 may pull the idler pulley 184 in a horizontal direction (e.g., represented by the arced path illustrated by arrow 187 of FIG. 4C) relative to the top plate 182 of the deck 172 to pull the idler pulley 184 into engagement with and exert a pushing force against the deck drive belt 136 (as depicted by arrow 189 of FIG. 4C). This force may remove (or "take up") slack in the deck drive belt 136 and maintain a tension of the deck drive belt 136. Maintaining the tension of the deck drive belt 136 may inhibit the deck drive belt 136 from slipping on, or slipping off of, the pulleys it is routed about, including, for example, the deck drive pulley 130 and the spindle pulleys 180a, 180b and 180c. The slack portion of the deck drive belt 136 may refer to a portion of the deck drive belt 136 that spans between the deck drive pulley 130 and an adjacent driven pulley that the deck drive belt 136 is routed to from the deck drive pulley 130, such as the first (left) spindle pulley 180a. The vertical position of the idler pulley 184 relative to the top plate 182 may be fixed by the idler arm 186 such that the idler pulley 184 moves with the deck 172 during operation of the mower 100. That is, the idler pulley 184 does not move in a vertical direction relative to the top plate 182 of the deck 172 during operation of the mower 100.

In some embodiments, the idler pulley 184 is a wide flat-belt pulley. A "wide" flat-belt pulley may be a flat-belt pulley that has a flat circumferential face (or groove) that is significantly wider (e.g., ≥25% wider) than the width (or "thickness") of a belt that engages (or is expected to engage) the pulley. For example, where the deck drive belt 136 has a width of about 0.5 in, the idler pulley 184 may have a flat circumferential face (or groove) having a width of about 0.6125 in or greater. The extra width may enable the flat side of the belt to move vertically (e.g., parallel to the rotational axis of the pulley) across the flat face of the pulley. A wide flat pulley may be suitable in locations where there is expected to movement or misalignment between adjacent pulleys and vertical movement of the belt is desirable. In the illustrated embodiments, the use of a wide-type idler pulley 184 may allow the deck drive belt 136 to move vertically relative to the idler pulley 184 (e.g., as a result of vertical movement or misalignment of an adjacent pulley) without causing wear that may otherwise occur if the face was relatively narrow such that even slight vertical movement of the deck drive belt 136 would result in contact with a lip of the idler pulley 184 that could wear the deck drive belt 136 or that would result in the deck drive belt 136 slipping off of the face of the idler pulley 184.

In some embodiments, the deck system 170 includes a stationary pulley 190 (see, e.g., FIGS. 3, 4A-4C and 5). The stationary pulley 190 may be sized and positioned to maintain a sufficient engagement of the deck drive belt 136 with adjacent pulleys. An angle of engagement of a pulley may be an angle defined by the portion of the circumference of the pulley that is engaged by (e.g., is in contact with) a belt. The stationary pulley 190 may be a flat pulley that is engaged by a flat side of a portion of the deck drive belt 136 that spans between the second (middle) spindle pulley 180b of the second (middle) spindle 176b and the third (right) spindle pulley 180c of the third (right) spindle 176c. The stationary pulley 190 may ensure that the angle of engagement (ϕ) of the deck drive belt 136 with each of the second (middle) spindle pulley 180b and the third (right) spindle pulley 180c are in the range of about 90°-125° (e.g., ϕ may be about 118°). The angle of engagement may vary based on positioning of components, such as the pulleys or the motor 102 and drive shaft 122. The stationary pulley 190 may positioned and sized to deflect the deck drive belt 136 from a straight path between the second (middle) spindle pulley 180b and the third (right) spindle pulley 180c such that the angle of engagement ($\phi_1$) of the deck drive belt 136 with the second (middle) spindle pulley 180b may be in the range of about 80°-100° (e.g., $\phi_1$ may be about 81°) and the angle of engagement ($\phi_2$) of the deck drive belt 136 with the third (right) spindle pulley 180c may be in the range of about 150°-180° (e.g., $\phi_2$ may be about 155° (see, e.g., FIG. 5 which illustrates components of a deck drive belt system 192 that employs an intermediate pulley system 194). The stationary pulley 190 may be coupled (e.g., bolted or fastened in a similar manner) to the top plate 182 of the deck 172 such that the stationary pulley 190 moves with the deck 172 during operation of the mower 100. That is, the stationary pulley 190 does not move in a vertical or horizontal direction relative to the top plate 182 of the deck 172 during operation of the mower 100.

In some embodiments, the cutting system 110 (and the deck drive belt system 192 and the intermediate pulley system 194) includes an intermediate pulley 200 (see, e.g., FIGS. 3, 4A-4C and 5). The intermediate pulley 200 may be sized and positioned to maintain a sufficient engagement of the deck drive belt 136 with adjacent pulleys. For example, the intermediate pulley 200 may be a flat pulley that is engaged by a flat side of a portion of the deck drive belt 136 that spans between the deck drive pulley 130 and the idler pulley 184. The intermediate pulley 200 may ensure that the angle of engagement (ϕ) of the deck drive belt 136 with the deck drive pulley 130 is in the range of about 90°-125° (e.g., ϕ may be about 118°). For example, the intermediate pulley 200 may be positioned and sized to deflect the deck drive belt 136 from a straight path between the deck drive pulley 130 and the idler pulley 184 such that the angle of engagement ($\phi_3$) of the deck drive belt 136 with the deck drive pulley 130 is in the range of about 180°-210° (e.g., $\phi_3$ may be about 148°-150°) (see, e.g., FIG. 5). The angle of engagement ($\phi_4$) of the deck drive belt 136 with the intermediate pulley 200 may be in the range of about 150°-210° (e.g., $\phi_4$ may be about 177°). The angle of engagement ($\phi_5$) of the deck drive belt 136 with the idler pulley 184 may be in the range of about 15°-45° (e.g., $\phi_5$ may be about 18°). The angle of engagement ($\phi_6$) of the deck drive belt 136 with the first (left) spindle pulley 180a may be in the range of about 160°-180° (e.g., $\phi_5$ may be about 176°).

In some embodiments, the intermediate pulley 200 is a narrow flat-belt pulley. A "narrow" flat-belt pulley may be a flat-belt pulley that has a flat circumferential face (or groove) that is not significantly wider (e.g., ≤25% wider) than the width (or "thickness") of a belt that engages (or is expected to engage) the pulley. For example, where the deck drive belt 136 has a width of about 0.5 in, the intermediate pulley 200 may have a flat circumferential face (or groove) having a width of about 0.5-0.6125 in (e.g., about 0.6 in). The limited width may inhibit the flat side of the belt from moving vertically (e.g., parallel to the rotational axis of the pulley) across the flat face of the pulley. A narrow flat pulley may be suitable in locations where there is expected to movement or misalignment between adjacent pulleys and it is desirable to limit vertical movement of the belt on the pulley. In the illustrated embodiments, the use of a narrow-type intermediate pulley 200 may inhibit the deck drive belt 136 from moving vertically relative to the deck drive pulley 130 (e.g., as a result of vertical movement of the idler pulley 184 and the first (left) spindle pulley 180a) which can prevent wear of the deck drive belt 136 that may otherwise occur at the deck drive pulley 130 if the face of the intermediate pulley 200 was relatively wide and allowed the deck drive belt 136 to move vertically relative to the deck drive pulley 130. In some embodiments, the intermediate pulley 200 is a wide flat-belt pulley. This may allow some vertical movement of the deck drive belt 136 which can help to reduce wear of the deck drive belt 136 that may otherwise occur at the idler pulley 184.

The diameter of a pulley may refer to a diameter of the groove or face of the pulley to that is engaged by a drive belt. In some embodiments, the intermediate pulley 200 has a diameter of in the range of about 3 in-6 in. For example, the intermediate pulley may have a diameter of about 4.75 in.

In some embodiments, the rotational axis of the intermediate pulley 200 is longitudinally offset forward of the rotational axis of the deck drive pulley 130 (e.g., in the y direction) by a longitudinal offset distance 210. The longitudinal offset distance 210 may be in the range of about 4.5 in to about 6.5 in. For example, the longitudinal offset distance 210 may be about 5.9 in.

In some embodiments, the rotational axis of the intermediate pulley 200 is laterally offset to the right of the rotational axis of the deck drive pulley 130 (e.g., in the x direction) by a lateral offset distance 212. The lateral offset distance 212 may be in the range of about 6 in to about 8.5 in. For example, the lateral offset distance 212 may be about 8 in.

In some embodiments, the rotational axis of the third (right) spindle pulley 180c is longitudinally offset forward the rotational axis of the deck drive pulley 130 (e.g., in the y direction) by a longitudinal offset distance 214. The longitudinal offset distance 214 may be in the range of about 7 in to about 9 in. For example, the longitudinal offset distance 214 may be about 8.2 in.

In some embodiments, the rotational axis of the third (right) spindle pulley 180c is laterally offset to the right of the rotational axis of the deck drive pulley 130 (e.g., in the x direction) by a lateral offset distance 216. The lateral offset distance 216 may be in the range of about 12 in to about 30 in. For example, the lateral offset distance 216 may be about 17.8 in. This distance may vary, for example, due to variations in deck size/width.

In some embodiments, the rotational axis of the idler pulley 184 is longitudinally offset forward the rotational axis of the deck drive pulley 130 (e.g., in the y direction) by a longitudinal offset distance 218. The longitudinal offset distance 218 may be in the range of about 4.5 in to about 7 in. For example, the longitudinal offset distance 218 may be about 5.1 in.

In some embodiments, the rotational axis of the idler pulley 184 is laterally offset to the right of the rotational axis of the deck drive pulley 130 (e.g., in the x direction) by a lateral offset distance 219. The lateral offset distance 219 may be in the range of about 6 in to about 9 in. For example, the lateral offset distance 219 may be about 8.8 in.

In some embodiments, the span 220 of the deck drive belt 136 between the idler pulley 184 and the intermediate pulley 200 is greater (or "longer") than the span 222 of the deck drive belt 136 between the intermediate pulley 200 and the deck drive pulley 130. The span of a belt between two pulleys may be defined as the distance between the points at which the belt engages/disengages the two pulleys. For example, the span 220 of the deck drive belt 136 between the idler pulley 184 and the intermediate pulley 200 may be defined by the exit point 224 at which the deck drive belt 136 exits (or "disengages") the intermediate pulley 200 and the entry point 226 at which the deck drive belt 136 enters (or "engages") the idler pulley 184. The span 222 of the deck drive belt 136 between the intermediate pulley 200 and the deck drive pulley 130 may be defined by the exit point 228 at which the deck drive belt 136 exits (or "disengages") the deck drive pulley 130 and the entry point 230 at which the deck drive belt 136 enters (or "engages") the deck drive pulley 130. The span between two pulleys may be the same as the distance between the rotational axes of the two pulleys. In some embodiments, the span 220 of the deck drive belt 136 between the intermediate pulley 200 and the idler pulley 184 is in the range of about 14 in-18 in. For example, the span 220 of the deck drive belt 136 between the intermediate pulley 200 and the idler pulley 184 may be about 17.0 in. In some embodiments, the span 222 of the deck drive belt 136 between the deck drive pulley 130 and the intermediate pulley 200 is in the range of about 6 in-9 in. For example, the span 222 of the deck drive belt 136 between the deck drive pulley 130 and the intermediate pulley 200 may be about 7.9 in.

The span 232 of the deck drive belt 136 between the third (right) spindle pulley 180c and the deck drive pulley 130 may be defined by the exit point 234 at which the deck drive belt 136 exits (or "disengages") the third (right) spindle pulley 180c and the entry point 236 at which the deck drive belt 136 enters (or "engages") the deck drive pulley 130. In some embodiments, the span 232 of the deck drive belt 136 between the third (right) spindle pulley 180c and the deck drive pulley 130 is in the range of about 16 in-24 in. For example, the span 232 of the deck drive belt 136 between the deck drive pulley 130 and the intermediate pulley 200 may be about 19.6 in. This distance may vary, for example, due to variations in deck size/width.

The intermediate pulley 200 may be coupled to the mower 100 such that the position of the intermediate pulley 200 does not change relative to the position of the deck drive pulley 130 during operation of the mower 100. That is, the intermediate pulley 200 does not move up, down, forward or backward relative to the deck drive pulley 130 during operation of the mower 100. The For example, the intermediate pulley 200 may be mounted (e.g., bolted or fastened in a similar manner) to an intermediate pulley bracket 202 that is mounted (e.g., bolted or fastened in a similar manner) to the frame weldment 112 (see, e.g., FIGS. 2 and 4A-4C). The intermediate pulley bracket 202 may be a rigid member (e.g., a member formed of steel) that inhibits movement of the intermediate pulley 200 relative to the frame 102 and the deck drive pulley 130. In an embodiment in which the motor 120 is fastened to the frame weldment 112 such that the motor 120 does not move relative to the frame weldment 112 during operation of the mower 100 and the intermediate pulley 200 is secured to the frame weldment 112 (e.g., the intermediate pulley 200 is fastened to the intermediate pulley bracket 202 fastened to the frame weldment 112) such that the position of the intermediate pulley 200 does not change relative to the position of the deck drive pulley 130 during operation of the mower 100, the intermediate pulley 200 may not move in a vertical or horizontal direction relative to the motor 120, the drive shaft 122, or the deck drive pulley 130, during operation of the mower 100.

In some embodiments, the horizontal position of the intermediate pulley 200 is adjustable. For example, the intermediate pulley bracket 202 may include a row of intermediate pulley holes 240 extending in a lateral direction (see, e.g., FIGS. 2 and 4A-4C). The intermediate pulley 200 may be coupled to anyone of the intermediate pulley holes 240. This may enable lateral (e.g., in the x direction) adjustment of the position of the intermediate pulley 200. For example, the intermediate pulley 200 may be fastened to the intermediate pulley bracket 202 with a bolt extending through a leftmost of intermediate pulley holes 240 to position the intermediate pulley 200 relatively close to the longitudinal axis 157 of the mower 100, relatively close to the idler pulley 184, relatively close to the deck drive pulley 130, and relatively far from the third (right) spindle pulley 180c. The intermediate pulley 200 may be fastened to the intermediate pulley bracket 202 with a bolt extending through the rightmost of intermediate pulley holes 240 to position the intermediate pulley 200 relatively far from the longitudinal axis 157 of the mower 100, relatively far from the idler pulley 184, relatively far from the deck drive pulley 130, and relatively close to the third (right) spindle pulley 180c. Such adjustability may help to account for different sizes of deck drive belts that may be used, or for tolerances during manufacture of the mower 100 that may cause variations in the distances between the intermediate pulley 200, the deck drive pulley 130 and the third (right) spindle pulley 180c.

Figure 6:
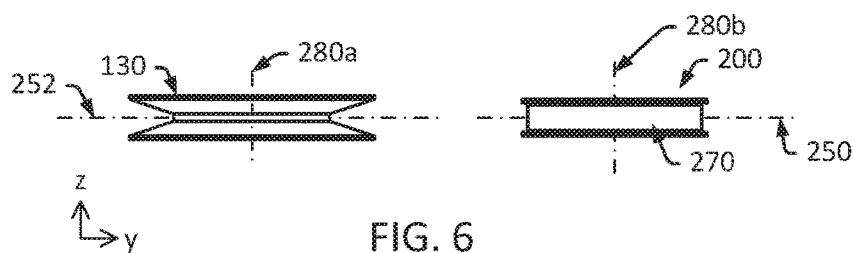
FIG. 6 is a diagram that illustrates a side view of pulleys of a deck drive belt system in accordance with one or more embodiments.

In some embodiments, the intermediate pulley 200 and the deck drive pulley 130 are vertically aligned (e.g., aligned in the y direction) with one another. For example, as illustrated in FIG. 6, a centerline 250 of the intermediate pulley 200 may be aligned with a centerline 252 of the deck drive pulley 130. The centerline of a pulley may be defined by a rotational plane of the pulley (which is transverse to the rotational axis of the pulley) that is centered in the groove or face of the pulley. Thus, for example, the centerline ("rotational plane") 250 of the intermediate pulley 200 may be co-planar with the centerline ("rotational plane") 252 of the deck drive pulley 130. In some embodiments, the intermediate pulley 200 and the deck drive pulley 130 are vertically aligned with one another if their centerlines 250 and 252 are co-planar and within a given offset distance (e.g., about 0.5 in) of one another. In some embodiments, the rotational axes of the deck drive pulley 130, the intermediate pulley, the idler pulley 184 and the spindle pulleys 180 are parallel (e.g., are parallel to the z-axis). In some embodiments, the rotational plane of the deck drive pulley 130, the intermediate pulley, the idler pulley 184 and the spindle pulleys 180 (e.g., are parallel to the x-y plane).

Figure 7A:
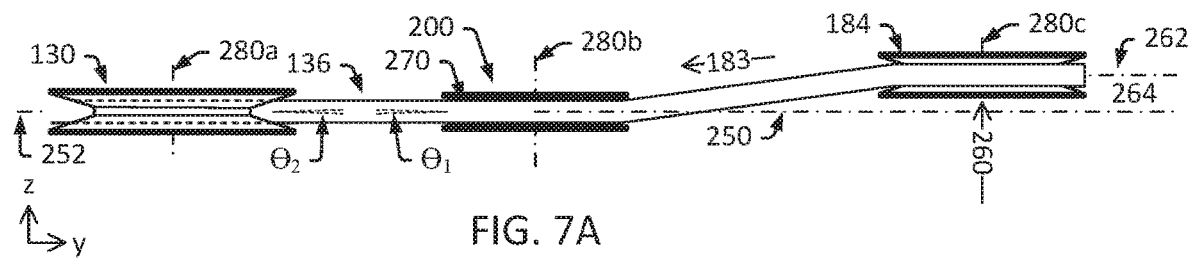
FIGS. 7A-7C are diagrams that illustrate side views of pulleys of a deck drive belt system in various configurations in accordance with one or more embodiments.
Figure 7B:
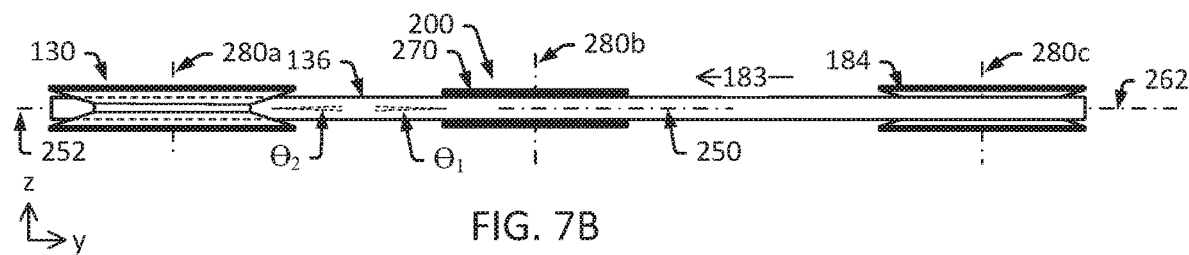
Figure 7C:
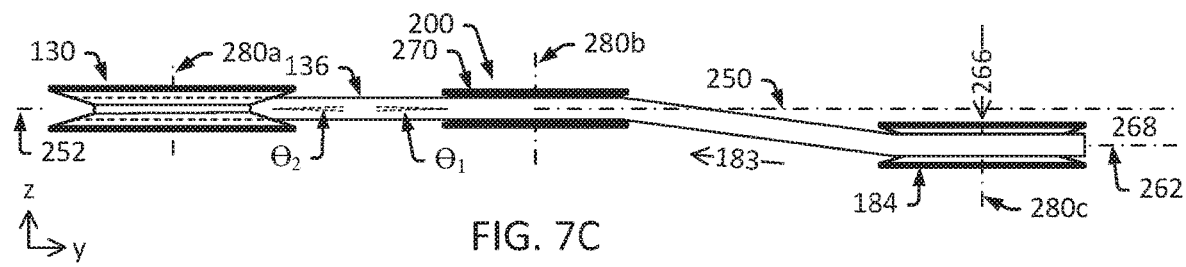

In some embodiments, the deck system 170 can be moved vertically (e.g., moved in the y direction) during operation of the mower 100. For example, the deck system 170 may be lowered relative to the frame 102 (e.g., moving the blades 174 closer to the ground to provide for mowing grass to a relatively short length) or the deck system 170 may be raised relative to the frame 102 (e.g., moving the blades 174 farther from the ground to provide for mowing grass to a relatively long length or for transport). In some embodiments, the horizontal and vertical position of the intermediate pulley 200 does not move relative to the frame 102, even while the deck system 170 (including the third (right) spindle pulley 180c) is moved vertically. For example, (referring to FIG. 7A) when the deck system 170 is raised, the idler pulley 184 and the third (right) spindle pulley 180c may move upward relative to the deck drive pulley 130 and the intermediate pulley 200 (and the frame 102) (e.g., the idler pulley 184 and the third (right) spindle pulley 180c may move upward in a direction parallel to the respective rotational axes 280a, 280b and 280c of the deck drive pulley 130, the intermediate pulley 200 and the idler pulley 184, as illustrated by the upward arrow 260 of FIG. 7A). This may result in the centerline 262 of the idler pulley 184 being vertically offset above the respective centerlines 250 and 252 of the deck drive pulley 130 and the intermediate pulley 200 by a given "positive" offset distance 264. Conversely, (referring to FIG. 7C) when the deck system 170 is lowered, the idler pulley 184 may move downward relative to the deck drive pulley 130 and the intermediate pulley 200 (and the frame 102) (e.g., the idler pulley 184 and the third (right) spindle pulley 180c may move downward in a direction parallel to the respective rotational axes 280a, 280b and 280c of the deck drive pulley 130, the intermediate pulley 200 and the idler pulley 184 as illustrated by the downward arrow 266 of FIG. 7C). This may result in the centerline 262 of the idler pulley 184 being vertically offset below the respective centerlines 250 and 252 of the deck drive pulley 130 and the intermediate pulley 200 by a given "negative" offset distance 268. In some instances, (referring to FIG. 7B), the deck system 170 may be moved to or through a height at which the centerline 262 of the idler pulley 184 aligns with the respective centerlines 250 and 252 of the deck drive pulley 130 and the intermediate pulley 200. In such an embodiment, the offset distance may be zero. Although the path of the deck drive belt 136 may move up and down the face 270 of the intermediate pulley 200 with corresponding upward and downward movement of the deck system 170 and the idler pulley 184 (as shown in FIGS. 7A-7C), the exit angle (01) of the intermediate pulley 200 and the corresponding entry angle (02) of the deck drive pulley 130 may remain relatively small (e.g., +/−0.5°). Accordingly, embodiments described here may help to inhibit wear and failure of the deck drive belt 136.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

As used throughout this application, the word "may" is used in a permissive sense (such as, meaning having the potential to), rather than the mandatory sense (such as, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A, B or C may refer to the element including A, B, C, A and B, A and C, B and C, or A, B and C. As used throughout this application, the term "from" does not limit the associated operation to being directly from. Thus, for example, receiving an item "from" an entity may include receiving an item directly from the entity or indirectly from the entity (e.g., by way of an intermediary entity). As used throughout this application, the term "coupled to" is not limited to being directly coupled. Thus, for example, an element "coupled" to another element may include the elements being directly coupled to one another, or indirectly coupled to one another (e.g., by way of an intermediary element).

What is claimed is:

1. A stand-on riding mower system, comprising:
   a mower frame;
   a mower motor coupled to the mower frame, the mower motor comprising a drive shaft configured to rotate;
   a mowing deck system coupled to the mower frame and configured to be raised or lowered relative to the mower frame, the mowing deck system comprising an idler pulley and a spindle pulley, wherein the spindle pulley is coupled to a mowing blade and engaged by a deck drive belt, wherein circulation of the deck drive belt is configured to rotate the spindle pulley and the mowing blade coupled to the spindle pulley, and wherein the idler pulley is biased to push against the deck drive belt to maintain a tension of the deck drive belt; and
   a deck drive belt system comprising:
      the deck drive belt;
      a deck drive pulley coupled to the drive shaft of the mower motor and engaged by the deck drive belt, wherein the deck drive pulley is configured to rotate with the drive shaft, and wherein rotation of the deck drive pulley is configured to cause the circulation of the deck drive belt; and
      an intermediate pulley coupled to the mower frame such that a position of the intermediate pulley is fixed relative to a position of the deck drive pulley such that a position of a rotational axis of the intermediate pulley is fixed relative to a position of a rotational axis of the deck drive pulley, wherein the intermediate pulley is engaged by a portion of the deck drive belt spanning between the deck drive pulley and the idler pulley.

2. The system of claim 1, wherein the deck drive belt is configured to circulate from the deck drive pulley to the intermediate pulley, from the intermediate pulley to the idler pulley, and from the idler pulley to the spindle pulley.

3. The system of claim 1, wherein a span of the deck drive belt between the idler pulley and the intermediate pulley is longer than a span of the deck drive belt between the intermediate pulley and the deck drive pulley.

4. The system of claim 1, wherein centerlines of the intermediate pulley and the deck drive pulley are aligned.

5. The system of claim 1, wherein the mowing deck system, the idler pulley and the spindle pulley are configured to move relative to the intermediate pulley and the deck drive pulley.

6. The system of claim 1, wherein the deck drive pulley comprises a V-pulley, the spindle pulley comprises a V-pulley, the idler pulley comprises a flat pulley, and the intermediate pulley comprises a flat pulley.

7. The system of claim 1, wherein the motor and the intermediate pulley are rigidly coupled to the mower frame.

8. The system of claim 1, wherein the mower system comprises a zero turn radius (ZTR) riding mower system.

9. A mower system, comprising:
a mower frame;
a mower motor coupled to the mower frame, the mower motor comprising a drive shaft configured to rotate;
a mowing deck system coupled to the mower frame and configured to be raised or lowered relative to the mower frame, the mowing deck system comprising an idler pulley biased into engagement with a deck drive belt to maintain a tension of the deck drive belt, wherein circulation of the deck drive belt is configured to rotate a spindle pulley and a mowing blade coupled to the spindle pulley; and
a deck drive belt system comprising:
the deck drive belt;
a deck drive pulley configured to couple to the drive shaft of the mower motor and be engaged by the deck drive belt, wherein the deck drive pulley is configured to rotate with the drive shaft, and wherein rotation of the deck drive pulley is configured to cause the circulation of the deck drive belt; and
an intermediate pulley coupled to the mower frame such that a position of the intermediate pulley is fixed relative to a position of the deck drive pulley such that a position of a rotational axis of the intermediate pulley is fixed relative to a position of a rotational axis of the deck drive pulley, wherein the intermediate pulley is configured to be engaged by a portion of the deck drive belt spanning between the deck drive pulley and the idler pulley.

10. The system of claim 9, wherein the deck drive belt is configured to circulate from the deck drive pulley to the intermediate pulley, from the intermediate pulley to the idler pulley, and from the idler pulley to the spindle pulley.

11. The system of claim 9, wherein a span of the deck drive belt between the idler pulley and the intermediate pulley is longer than a span of the deck drive belt between the intermediate pulley and the deck drive pulley.

12. The system of claim 9, wherein centerlines of the intermediate pulley and the deck drive pulley are aligned.

13. The system of claim 9, wherein the mowing deck system and the idler pulley are configured to move relative to the intermediate pulley and the deck drive pulley.

14. The system of claim 9, wherein the deck drive pulley comprises a V-pulley, the idler pulley comprises a flat pulley, and the intermediate pulley comprises a flat pulley.

15. The system of claim 9, wherein the motor and the intermediate pulley are rigidly coupled to the mower frame.

16. The system of claim 9, wherein the mower system comprises a stand-on riding mower system.

17. The system of claim 9, wherein the mower system comprises a zero turn radius (ZTR) riding mower system.

18. A mower system, comprising:
an idler pulley biased into engagement with a deck drive belt to maintain a tension of the deck drive belt, wherein circulation of the deck drive belt is configured to rotate a spindle pulley and a mowing blade coupled to the spindle pulley;
a deck drive pulley coupled to a drive shaft of a mower motor coupled to a mower frame of the mower system, the deck drive pulley configured to be engaged by the deck drive belt, wherein the deck drive pulley is configured to be rotated by the drive shaft, and wherein rotation of the deck drive pulley is configured to cause the circulation of the deck drive belt; and
an intermediate pulley coupled to the mower frame such that a position of the intermediate pulley is fixed relative to a position of the deck drive pulley such that a position of a rotational axis of the intermediate pulley is fixed relative to a position of a rotational axis of the deck drive pulley, wherein the intermediate pulley is configured to be engaged by a portion of the deck drive belt spanning between the deck drive pulley and the idler pulley.

19. The system of claim 18, wherein the idler pulley is configured to move relative to the deck drive pulley and the intermediate pulley.

20. The system of claim 18, wherein the deck drive belt is configured to circulate from the deck drive pulley to the intermediate pulley, and from the intermediate pulley to the idler pulley.

* * * * *